(12) United States Patent
Qin et al.

(10) Patent No.: US 9,942,859 B2
(45) Date of Patent: *Apr. 10, 2018

(54) WIRELESS COMMUNICATIONS SYSTEM AND METHOD FOR PERFORMING WIRELESS COMMUNICATION IN WIRELESS COMMUNICATIONS SYSTEM

(71) Applicant: SONY CORPORATION, Minato-ku (JP)

(72) Inventors: Zhongbin Qin, Beijing (CN); Yuxin Wei, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,017

(22) Filed: Jun. 6, 2017

(65) Prior Publication Data
US 2017/0273032 A1 Sep. 21, 2017

Related U.S. Application Data

(63) Continuation of application No. 15/035,347, filed as application No. PCT/CN2014/092741 on Dec. 2, 2014, now Pat. No. 9,713,103.

(30) Foreign Application Priority Data

Dec. 3, 2013 (CN) .......................... 2013 1 0642112

(51) Int. Cl.
*H04W 52/28* (2009.01)
*H04L 5/00* (2006.01)
(Continued)

(52) U.S. Cl.
CPC .......... *H04W 52/28* (2013.01); *H04L 5/0041* (2013.01); *H04W 52/146* (2013.01);
(Continued)

(58) Field of Classification Search
CPC .......................... H04W 52/28; H04W 72/0413
(Continued)

(56) References Cited

U.S. PATENT DOCUMENTS

2009/0197632 A1* 8/2009 Ghosh ................... H04W 52/24
 455/522
2010/0265904 A1 10/2010 Yang et al.
(Continued)

FOREIGN PATENT DOCUMENTS

| CN | 101873291 A | 10/2010 |
|---|---|---|
| CN | 102594527 A | 7/2012 |
| WO | 2013/109084 A1 | 7/2013 |

OTHER PUBLICATIONS

International Search Report dated Mar. 2, 2015 in PCT/CN2014/092741 filed Dec. 2, 2014.

*Primary Examiner* — John J Lee
(74) *Attorney, Agent, or Firm* — Oblon, McClelland, Maier & Neustadt, L.L.P.

(57) ABSTRACT

A wireless communications system and a method for performing wireless communication in a wireless communications system. The wireless communications system includes: a first base station node; a second base station node; and a wireless communications apparatus, performing communication with the first base station node and the second base station node. The first base station node and the second base station node perform scheduling coordination, to reduce a probability that the wireless communications apparatus sends an uplink signal to the first base station node and the second base station node simultaneously. The system and method can reduce a probability that a wireless communications apparatus sends an uplink signal to a first base station node and a second base station node simultaneously, thereby effectively ensuring uplink/downlink transmission performance.

20 Claims, 6 Drawing Sheets

(51) Int. Cl.
*H04W 52/34* (2009.01)
*H04W 72/04* (2009.01)
*H04W 52/36* (2009.01)
*H04W 52/14* (2009.01)
*H04W 74/08* (2009.01)
*H04W 84/10* (2009.01)
*H04W 88/02* (2009.01)

(52) U.S. Cl.
CPC ....... *H04W 52/281* (2013.01); *H04W 52/346* (2013.01); *H04W 52/367* (2013.01); *H04W 72/0413* (2013.01); *H04W 74/0833* (2013.01); *H04W 84/105* (2013.01); *H04W 88/02* (2013.01)

(58) Field of Classification Search
USPC .................. 455/522, 69, 509, 512, 452.1
See application file for complete search history.

(56) References Cited

U.S. PATENT DOCUMENTS

| | | |
|---|---|---|
| 2013/0083754 A1 | 4/2013 | Chen et al. |
| 2013/0286991 A1 | 10/2013 | Yang et al. |
| 2015/0003305 A1 | 1/2015 | Park et al. |
| 2016/0044606 A1* | 2/2016 | Yin .................... H04W 52/325 455/450 |
| 2016/0174170 A1* | 6/2016 | Yang .................... H04W 36/22 370/329 |
| 2016/0174172 A1* | 6/2016 | Rahman .............. H04W 52/246 455/522 |

* cited by examiner

WIRELESS COMMUNICATIONS SYSTEM AND METHOD FOR PERFORMING WIRELESS COMMUNICATION IN WIRELESS COMMUNICATIONS SYSTEM

INCORPORATION BY REFERENCE

This application is a continuation of U.S. application Ser. No. 15/035,347, filed on May 9, 2016, which is based on PCT filing PCT/CN2014/092741 filed Dec. 2, 2014, and claims priority to Chinese Application No. 201310642112.2, filed on Dec. 3, 2013. The entire contents of each of which are incorporated herein by reference.

FIELD

The present disclosure relates to the technical field of wireless communication, and in particular to a wireless communication system and a method for performing wireless communication in a wireless communication system.

BACKGROUND

This section provides background information relating to the present disclosure, which is not necessarily prior art.

Under the conventional scene of carrier aggregation within a base station, a PUCCH (Physical Uplink Control Channel) can be transmitted only on a PCC (Primary Component Carrier) of a Pcell (Primary cell), a PUSCH (Physical Uplink Shared Channel) and an SRS (Sounding Reference Signal) may be transmitted on the PCC of the Pcell or an SCC (Secondary Component Carrier) of an Scell (Secondary cell), and a PRACH (Physical Random Access Channel) signal is transmitted only when a certain carrier is to be connected to a terminal. Generally, the terminal and the PCC maintain a connection state, and the SCC is connected to the terminal in a case that the PCC is successfully connected to the terminal. In addition, UCI (Uplink Control Information) is transmitted by only one PUSCH within one subframe, and the SRS is transmitted only once within one subframe in a case that multiple aggregated carriers share one TA. Particularly, in case of transmitting the PRACH, the terminal does not transmit the PUCCH/PUSCH/SRS signal simultaneously.

Under a scene of carrier aggregation for inter base-station for non-fiber direct connection or dual connectivity, since real time scheduling coordination inter base-station cannot be performed, resulting in that a probability of exceeding the maximum transmission power in uplink transmission is higher as compared with the scene of carrier aggregation for intra base-station. Presently, there is no good solution as to the above issue, and thereby resulting in reducing of uplink/downlink transmission efficiency.

SUMMARY

This section provides a general summary of the present disclosure, and is not a comprehensive disclosure of its full scope or all of its features.

An object of the present disclosure is to provide a wireless communication system and a method for performing wireless communication in a wireless communication system, such that in a case of a limited UE (User Equipment) uplink transmission power, a probability that the UE performing carrier aggregation for inter base-station or dual connectivity transmits an uplink signal to two base stations simultaneously can be efficiently avoided or reduced, thereby efficiently ensuring uplink/downlink transmission performance.

According to a first aspect of the present disclosure, a wireless communication system is provided, the wireless communication system includes: a first base station node; a second base station node; and a wireless communication device communicating with the first and second base station nodes, where the first and second base station nodes perform scheduling coordination, so as to reduce a probability that the wireless communication device transmits an uplink signal to the first and second base station nodes simultaneously.

According to another aspect of the present disclosure, a method for performing wireless communication in a wireless communication system is provided, where the wireless communication system includes a first base station node, a second base station node and a wireless communication device communicating with the first and second base station nodes, and the method includes: performing, by the first and second base station nodes, scheduling coordination, so as to reduce a probability that the wireless communication device transmits an uplink signal to the first and second base station nodes simultaneously.

With the wireless communication system and the method for performing wireless communication in a wireless communication system according to the present disclosure, the first and second base station nodes perform scheduling coordination, so as to reduce the probability that the wireless communication device transmits the uplink signal to the first and second base station nodes simultaneously, thereby efficiently ensuring uplink/downlink transmission performance.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1:
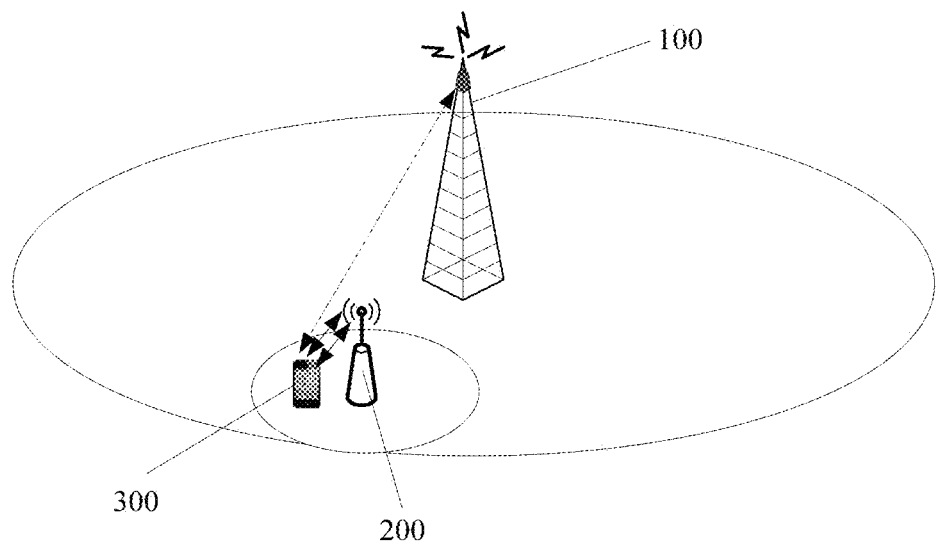
FIG. 1 is a schematic diagram of a scene of carrier aggregation for inter base-station according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. It should be noted that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

As described in the background, under the conventional scene of carrier aggregation for intra base-station, the PUCCH can be transmitted only on the uplink main carrier, the PUSCH and the SRS may be transmitted on the SCC or the PCC, and the PRACH signal is transmitted only when a certain carrier is to be connected to the terminal; generally, the terminal and the PCC maintain a connection state, and the SCC is connected to the terminal only in a case that the PCC is successfully connected to the terminal. In addition, the UCI can be transmitted by only one PUSCH within one subframe, and the SRS can be transmitted only once within one subframe in a case that multiple aggregated carriers share one TA. Particularly, in case of transmitting the PRACH, the terminal does not transmit the PUCCH/PUSCH/SRS signal simultaneously. Since distances from respective terminals to the base station are different in the network, in order to ensure that transmitted data arrives according to the timing sequence, the respective terminals adjust TA (Timing Advanced) of data transmission time based on different distances between the respective terminals and the base station. In a solution known for the inventor (which is not necessarily the prior art), in a case that the terminal shares one TA value on all the uplink aggregated carriers, and if the PUCCH and the PUSCH are transmitted within one carrier or multiple carriers simultaneously and a total transmission power is required to be greater than the maximum transmission power of the UE, the transmission power requirement for the PUCCH is satisfied with a priority; and if there is a remaining transmission power, subsequently the transmission power requirement for the PUSCH data carrying the UCI information is satisfied.

Subsequently, if there is still a remaining transmission power, the power requirement for the PUSCH data carrying no UCI information is satisfied; and the SRS is transmitted if the remaining power satisfies the power requirement for the SRS, otherwise the SRS is discarded.

In addition to that the above cases may result in that the uplink total transmission power of the terminal exceeds the maximum value, after multiple TA groups are introduced in case of performing carrier aggregation for intra base-station, since TAs of the uplink transmission time of the terminal are different, power transmission peaks may overlap in an overlapped region of adjacent subframes, and thereby resulting in that the uplink total transmission power of the terminal exceeds the maximum value. The transmission contents in case of overlap are shown in FIG. 1.

TABLE 1

| | scene of simultaneous transmission for an uplink channel/signal based on multiple TAs | | | | |
|---|---|---|---|---|---|
| | | PCell/Scell | | | |
| | PUCCH(only | PRACH | | | |
| SCell | for Pcell) | PCell | Scell | PUSCH | SRS |
| PRACH | √ | x | x | √ | √ |
| PUSCH | √ | x | √ | √ | √ |
| SRS | √ | x | √ | √ | √ |

In a case of exceeding the maximum transmission power in the overlapped region, it is known by the inventor that the following solutions (which is not necessarily the prior art) may be provided.

If PUCCH/PUSCH transmission of a UE on a subframe i for a given service cell among a TA group overlaps with a certain part of a first symbol of PUSCH transmission on a subframe i+1 for a different service cell among another TA group, the UE adjusts its total transmission power, so as not to exceed a threshold $P_{CMAX}$ at any overlapped part;

if the PUSCH transmission of the UE on the subframe i for a given service cell among a TA group overlaps with a certain part of a first symbol of the PUCCH transmission on a subframe i+1 for a different service cell among another TA group, the UE adjusts its total transmission power, so as not to exceed $P_{CMAX}$ at any overlapped part;

if SRS transmission of the UE in symbols on the subframe i for a given service cell among a TA group overlaps with PUCCH/PUSCH transmission on the subframe i or a subframe i+1 for a different service cell among the same or another TA group, the UE discards the SRS if the total transmission power exceeds $P_{CMAX}$ at any overlapped part of the symbol;

if the SRS transmission of the UE in symbols on the subframe i for a given service cell overlaps with SRS transmission on the subframe i for (one or more) different service cell(s) and overlaps with PUSCH/PUCCH transmission on the subframe i or the subframe i+1 for (one or more) additional service cell(s), the UE discards the SRS transmission if the total transmission power exceeds $P_{CMAX}$ at any overlapped part of the symbol;

when a higher layer requests to transmit PRACH in a secondary service cell in parallel with the SRS transmission in symbols on the subframe for different service cells among different TA groups, the UE discards the SRS if the total transmission power exceeds $P_{CMAX}$ at any overlapped part of the symbol; and when the higher layer requests to transmit PRACH in the secondary service cell in parallel with PUSCH/PUCCH for different service cells among different TA groups, the UE adjusts a transmission power for PUSCH/PUCCH, such that the total transmission power does not exceed $P_{CMAX}$ at the overlapped part.

Under the scene of carrier aggregation for inter base-station in the present disclosure, as described in the background, since scheduling between base stations cannot be coordinated, the probability that the total transmission power exceeds the maximum transmission power in uplink transmission is higher as compared with scene of carrier aggregation for intra base-station. If the method in the above known solution that the terminal adjusts the power or discards the signaling is used continuously, thereby resulting in reducing of uplink/downlink transmission efficiency. In addition, the following new cases will occur:

the terminal may transmit the UCI to two base stations within the same subframe on different PUSCHs; the terminal may transmit PUCCH to two base stations on the same subframe respectively; or the terminal transmits PUCCH to one base station on a subframe n and transmits PUCCH to the other base station on a subframe n+1, and two PUCCHs overlap partially on OFDM (Orthogonal Frequency Division Multiplexing) symbols.

For the new cases, the method that the terminal adjusts the power or discards the signaling is no longer adaptable.

The present disclosure is aimed at addressing at least one of the above issues, so as to further improve uplink/downlink transmission efficiency.

FIG. 1 shows a scene of carrier aggregation for inter base-station according to an embodiment of the present disclosure. In the scene shown in FIG. 1, a wireless communication system 10 includes a macro base station (corresponding to a first base station node) 100, a low power node (corresponding to a second base station node) 200 and a UE (corresponding to a wireless communication device) 300. The UE 300 may communicate with the macro base station 100 and the low power node 200.

As shown in FIG. 1, the macro base station 100 covers a wide coverage area referred to as a macro cell, and the low power node 200 covers a narrow coverage area referred to as a micro cell. There is no base band shared processing mode for fiber direct connection between the macro base station 100 and the low power node 200. The UE 300 communicates with the macro base station 100 via a CC (Component Carrier) 1. Meanwhile, the UE 300 communicates with the low power node 200 via a CC2 and a CC3. In which, the CC1 is a communication main carrier of the UE 300 and the macro base station 100, and the CC2 is a communication main carrier of the UE 300 and the low power node 200 (i.e., a carrier of the low power node 200 for transmitting PUCCH). It should be noted that, the CC 1 is an uplink/downlink carrier pair in an FDD (Frequency Division Duplexing) mode and is a single carrier in a TDD mode, and the case also adapts to the CC2 and the CC3.

In FIG. 1, a power of a signal transmitted from the UE 300 to the macro base station 100 and the low power node 200 simultaneously is too high. In an embodiment of the present disclosure, it is assumed that the UE 300 transmits data to two base station nodes simultaneously in case of the UE 300 being far away from the macro base station 100, and in this case a probability that an uplink total transmission power exceeds the maximum transmission power is high. In this example, the UE 300 determines whether it is far away from the macro base station 100 based on a downlink path loss of the macro base station 100; and the UE 300 notifies the network side to perform scheduling coordination for inter base-station to reduce a probability that frames overlap or symbols overlap, if so. For example, a probability that the uplink total transmission power exceeds the maximum transmission power for different distances between the UE and the macro base station may be accounted in advance, and a distance corresponding to a probability exceeding a threshold is regarded as a distance for which the UE is far away from the macro base station. In an optional example, the UE 300 determines whether it needs to transmit data to two base station nodes simultaneously based on scheduling information of an uplink signal from respective base stations for example; and the UE 300 may notify the network side to perform scheduling coordination for inter base-station to reduce a probability that frames overlap or symbols overlap, if so. In another example, the UE 300 may notify the network side to perform scheduling coordination for inter base-station to reduce a probability that frames overlap or symbols overlap only in a case that it is determined that the uplink total transmission power will exceed the maximum transmission power according to the scheduling requirements to the uplink signals from respective base stations.

According to the embodiments of the present disclosure, the macro base station 100 may perform scheduling coordination with the low power node 200, so as to reduce a probability that the UE 300 transmits an uplink signal to the macro base station 100 and the low power node 200 simultaneously. Here, the scheduling coordination is performed by the macro base station 100. Preferably, the UE 300 may transmit the notification for requesting scheduling coordination for inter base-station to a scheduling coordination device, i.e., the macro base station 100. The present disclosure has no particular restriction on the scheduling coordination device. For example, the scheduling coordination may also be performed by assisting by the low power node 200 or other devices at the network side. For facilitating illustrating, it is assumed that the scheduling coordination is performed by the macro base station 100 for example hereinafter.

According to the embodiments of the present disclosure, in a case that the UE 300 transmits an uplink signal to the macro base station 100 and the low power node 200 simultaneously, transmission overlap of same subframes or transmission overlap of symbols between subframes occurs. Here, the uplink signal may include but not limited to a PUCCH signal, a PUSCH signal, an SRS signal and a PRACH signal.

According to the embodiments of the present disclosure, the UE 300 may transmits fewer uplink signals to the macro base station 100, so as to reduce the probability that the UE 300 transmits the uplink signal to the macro base station 100 and the low power node 200 simultaneously.

In a specific example of the present disclosure, after receiving the notification for requesting scheduling coordination for inter base-station transmitted by the UE 300, the macro base station 100 transmits a scheduling coordination request to the low power node 200, so as to request the low power node 200 to receive and forward, from the UE 300, an uplink signal (for example a PUSCH) which was intended to be transmitted to the macro base station 100. After obtaining the confirmation from the low power node 200, the macro base station 100 transmits feedback information on scheduling coordination for inter base-station to the UE 300, so as to instruct the UE 300 to transmit the uplink signal which was intended to be transmitted to the macro base station 100 to the low power node 200. Ideally, all the uplink signals may be transferred to the low power node 200 for transmission. With the above method, in one hand, the uplink transmission power may be saved; and in the other hand, the probability that the PUSCH is transmitted to two base station nodes simultaneously may be reduced greatly. In this way, data transmission of the macro base station 100 only includes a small amount of PUSCH (and PDSCH, transmission of PDSCH indicates PUCCH feedback of A/N, while the PUCCH will also feedback periodic CQI information) transmission to maintain RRC (Radio Resource Control) connection, channel quality measuring reporting (including mobility measuring and scheduling measuring), normal signaling interaction and other signaling interaction of carrier aggregation for inter base-station. In this case, if the downlink service from the macro base station 100 to the UE 300 is not transferred to the low power node 200 for transmission, a frequency of the PUCCH transmission increases as the downlink data transmission of the macro base station 100 increases, and thereby increasing the probability that the UE 300 transmits data to two base station nodes in parallel and thereby resulting in the transmission power exceeds the maximum transmission power. Hence, preferably, in the above examples of the present disclosure, the scheduling coordination request transmitted from the macro base station 100 to the low power node 200 further includes a request that the low power node 200 receives, from the macro base station 100, downlink data (for example PDSCH) which was intended to be transmitted from the macro base station 100 to the UE 300 and forwards the downlink data to the UE 300.

Apparently, although it may be advised that all the services are transferred to the low power node 200 for transmitting as much as possible, the probability that the performance is reduced due to transmitting in parallel at the same time instant may be further reduced by coordinating.

Figure 2:
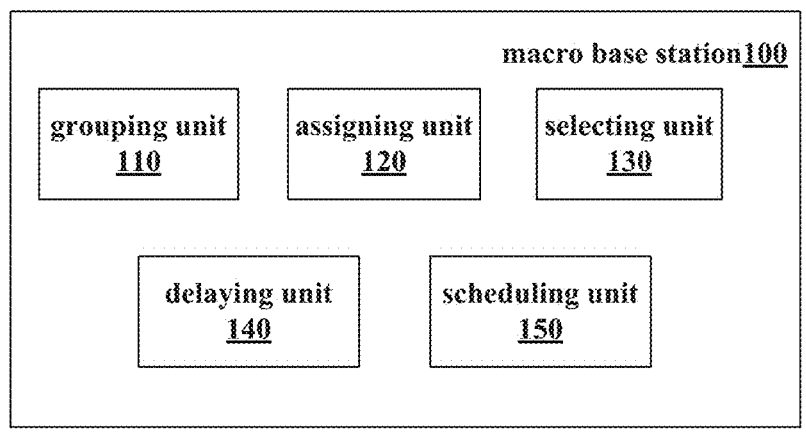
FIG. 2 is a block diagram of a base station node according to an embodiment of the present disclosure.

FIG. 2 shows a block diagram of a macro base station 100 according to an embodiment of the present disclosure. The macro base station 110 may adapt to a scene in which the wireless communication system is an FDD system, a TDD system or a TDD and FDD hybrid system. As shown in FIG. 2, a selecting unit 130, a grouping unit 110 and an assigning unit 120 may be provided in the macro base station 100.

The selecting unit 130 may select a reference configuration for coordinating subframe assignment of the macro base station 100 and the low power node 200 within a scheduling coordination period. For example, in a case that the wireless communication system is the TDD system or the TDD and FDD hybrid system, uplink/downlink matching for respective carriers may be different. In this case, a reference configuration for scheduling coordination may be selected by the selecting unit 130.

Preferably, particularly in a case that connection carriers between the UE 300, the macro base station 100 and the low power node 200 each belongs to the FDD standard or the TDD standard with the same uplink/downlink matching, the uplink/downlink reference configuration may be set as a main carrier uplink/downlink configuration of a main carrier of the UE 300 at one of the macro base station 100 and the low power node 200.

Preferably, particularly in a case that the connection carriers between the UE 300, the macro base station 100 and the low power node 200 each is TDD carriers or contains both the FDD carrier and the TDD carrier, the uplink/downlink reference configuration may be set as a merging set uplink/downlink configuration formed by taking a merging set for uplink subframes of all carriers of the UE 300 at the one of the macro base station 100 and the low power node 200.

Figure 3:
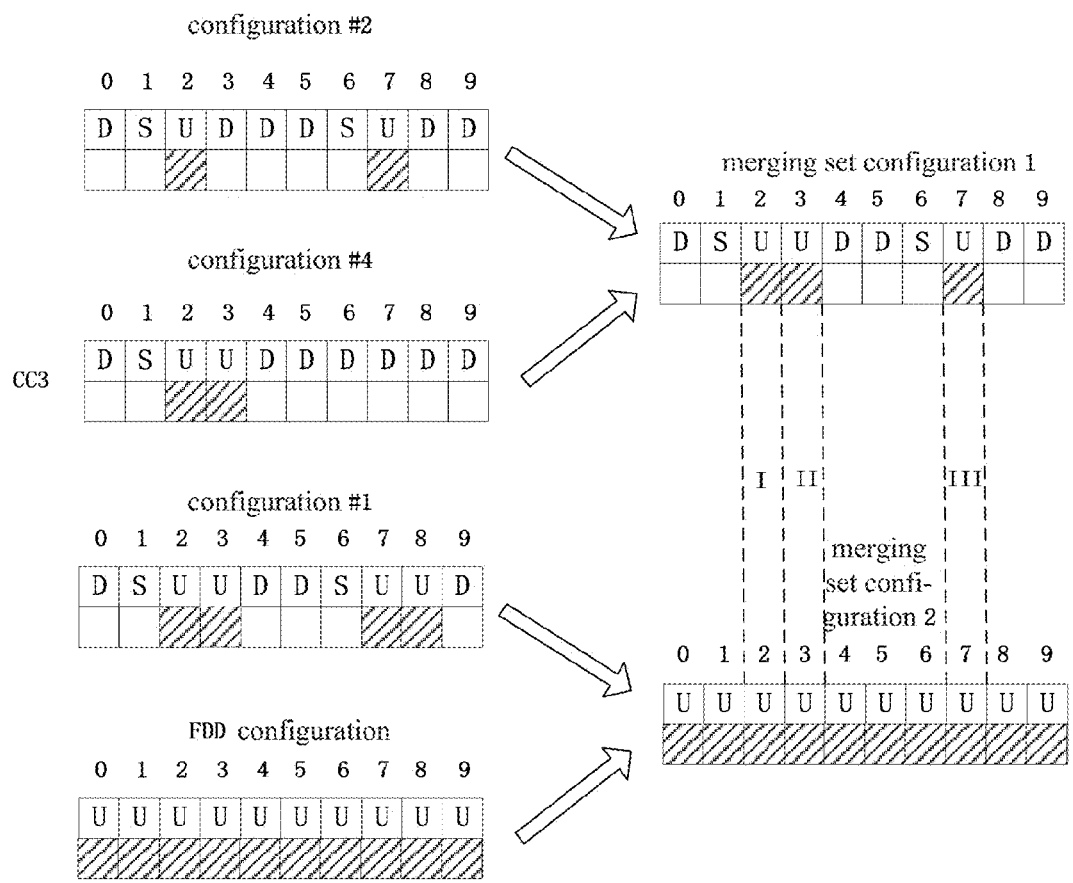
FIG. 3 is a schematic diagram of setting of an uplink/downlink reference configuration.

FIG. 3 shows an example of the above setting way of the uplink/downlink reference configuration. As shown in FIG. 3, it is assumed that carries of the UE 300 at the macro base station 100 include a CC1 of a configuration #2 adopting the TDD standard and a CC3 of a configuration #4 adopting the TDD standard, and carriers of the UE 300 at the low power node 200 include a CC2 of a configuration #1 adopting the TDD standard and a CC4 adopting the FDD standard.

In carriers of the macro base station 100, the configuration #2 includes uplink subframes 2 and 7, and the configuration #4 includes uplink subframes 2 and 3. In case of setting the uplink/downlink reference configuration of the macro base station 100, a merging set may be taken for uplink subframes of the configuration #2 and the configuration #4, so as to obtain a merging set configuration 1. The merging set configuration 1 includes uplink subframes 2, 3 and 7.

In carriers of the low power node 200, the configuration #1 includes uplink subframes 2, 3, 7 and 8. In addition, since the FDD standard does not have fixed uplink/downlink, it is considered by regarding all the subframes as uplink subframes. In case of setting the uplink/downlink reference configuration of the low power node 200, a merging set may be taken for uplink subframes of the configuration #1 and the FDD standard, so as to obtain a merging set configuration 2. All the subframes in the merging set configuration 2 are uplink subframes. In this way, the merging set configuration 1 and the merging set configuration 2 include three overlapped uplink subframes, which may be grouped as three uplink subframe subgroups I, II and III, as shown in FIG. 3.

In a case that the uplink/downlink reference configuration adopts the merging set configuration mode, it needs to transmit a specific bitmap (for example, the merging set configuration 1 in FIG. 3) to the macro base station 100 or the low power node 200 for notifying, which consumes resource. In order to avoid the issue, an existing uplink/downlink reference configuration being closest to the merging set uplink/downlink configuration and containing all of the uplink subframes in the merging set uplink/downlink configuration, may be selected from the existing 7 types of uplink/downlink configurations of the TDD standard as the uplink/downlink reference configuration. For example, as shown in FIG. 3, the merging set configuration 1 includes uplink subframes 2, 3 and 7. An existing uplink/downlink configuration being closest to the merging set configuration 1 and containing all the uplink subframes 2, 3 and 7 in the merging set configuration 1 is the configuration #1, which includes uplink subframes 2, 3, 7 and 8. Hence, the configuration #1 may be selected as the uplink/downlink reference configuration. In this way, only a configuration serial number of the configuration #1 needs to be transmitted to the macro base station 100 or the low power node 200 for notifying, and thereby saving resource.

In addition, in a case that one carrier of the UE 300 at the macro base station 100 or the low power node 200 has uplink subframes of remaining aggregated carries at the same time slot of one wireless frame, the uplink/downlink configuration of the carrier with the most uplink subframes directly functions as the reference configuration of the macro base station 100 or the low power node 200. In addition, in a case that the connection carriers between the UE 300, the macro base station 100 and the low power node 200 each is TDD carriers or includes both FDD carriers and TDD carriers and no carrier of the UE 300 at the macro base station 100 or the low power node 200 has uplink subframes of the remaining aggregated carriers at the same time slot of one wireless frame, the reference configuration may be set as a configuration with the least uplink subframes and satisfying the following condition: the configuration has uplink subframes of all the aggregated carries on the macro base station 100 or the low power node 200 at the same time slot of one wireless frame.

The grouping unit 110 may group uplink subframes overlapped within the scheduling coordination period according to the uplink/downlink reference configuration of the macro base station 100 and the low power node 200, so as to obtain multiple subframe subgroups (for example, the subframe subgroups I, II and III shown in FIG. 3). It should be noted that, for facilitating illustration, FIG. 3 is depicted based on the same TA. In an actual case, subframes of respective carriers may be not aligned, but the overlapped subframes for respective carries may be grouped as an uplink subframe subgroup.

The assigning unit 120 may assign at least a first subframe subgroup of multiple subframe subgroups to the macro base station 100 and assign at least a second subframe subgroup of multiple subframe subgroups to the low power node 200, so as to coordinate utilizing of possibly overlapping uplink subframes by the macro base station 100 and the low power node 200. For example, in the first subframe subgroup, the UE 300 may only transmit a PUCCH signal, an SRS signal, a PRACH signal or an initially transmitted PUSCH signal to the macro base station 100; and in the second subframe subgroup, the UE 300 may only transmit the PUCCH signal, the SRS signal, the PRACH signal or the initially transmitted PUSCH signal to the low power node 200. Within the scheduling coordination period, if in the initial transmission scheduling an uplink subframe is assigned by the assigning unit 120 to one base station node of the macro base station 100 and the low power node 200 for scheduling, the other base station node of the macro base station 100 and the low power node 200 cannot schedule all the subframes in a subframe subgroup to which the uplink subframe belongs to perform uplink initial transmission. In this way, a probability that the UE 300 transmits an uplink signal as initially transmitted data to the macro base station 100 and the low power node 200 simultaneously is efficiently reduced.

In addition, in a case that time-continuous adjacent subframes are assigned to the macro base station 100 and the low power node 200 respectively, a subframe subgroup to which a subframe whose time is early belongs may be assigned by the assigning unit 120 to a base station node whose value of TA (Timing Advanced) of uplink transmission time is larger of the macro base station 100 and the low power node 200, for example the macro base station node 100, and a subframe subgroup to which a subframe whose time is late belongs may be assigned by the assigning unit 120 to a base station node whose value of TA (Timing Advanced) of uplink transmission time is smaller of the macro base station 100 and the low power node 200, for example the low power node 200. In this way, symbol overlapping may be avoided better.

In a case that the uplink/downlink reference configurations for coordinating subframe assignment of the UE 300 at the macro base station 100 and the low power node 200 belong to the TDD standard, a delaying unit 140 may be further provided in the macro base station 100, as shown in FIG. 2. The delaying unit 140 may delay a starting frame of TDD wireless frames of one base station node of the macro base station 100 and the low power node 200 for several time slots (preferably, two time slots) than that of the other base station node of the macro base station 100 and the low power node 200. Preferably, uplink subframes or special subframes at same locations within different wireless frames may be grouped together. It should be noted that, the special subframes may transmit an SRS, and symbol overlapping between frames may occur, i.e., the SRS symbols of the special subframes overlap with PUCCH/PUSCH symbols of next subframes of other carriers. Hence, it is necessary to group uplink frames and uplink frames, uplink subframes and special subframes, or special subframes and special subframes together at the same locations within different wireless frames.

Figure 4:
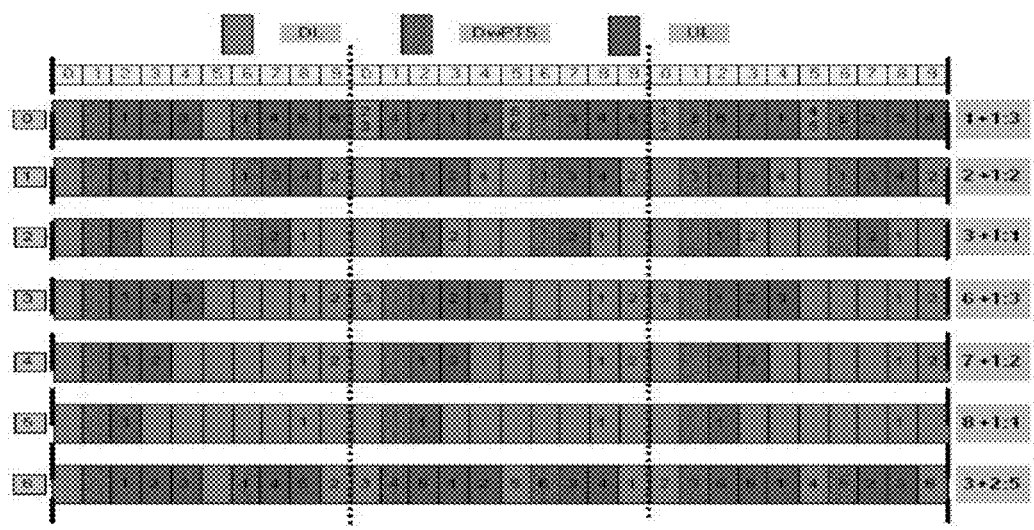
FIG. 4 is a schematic diagram of an uplink/downlink matching of TDD (Time Division Duplexing)

The above technical solution of the present disclosure is described in detail in conjunction with FIG. 4. FIG. 4 shows an uplink/downlink matching of TDD. Since for the TDD the number of uplink subframes is limited, uplink resource shortage will be further intensified in a case that the macro base station 100 and the low power node 200 multiplex uplink subframes in the time domain.

The delaying unit 140 may delay a starting frame of wireless frames of one base station node of the macro base station 100 and the low power node 200 for two time slots than that of the other base station node of the macro base station 100 and the low power node 200, so as to reduce the number of overlapped uplink subframes. For example, the macro base station 100 may calculate a subframe serial number based on one TDD matching from a certain time instant, and the low power node 200 may calculate a subframe serial number based on one TDD matching from two milliseconds (two time slots) after the certain time instant. Here, it is not limited to two time slots, as long as the number of overlapped uplink subframes can be further reduced.

Similarly, in this case, the grouping unit 110 may group uplink subframes overlapped within the scheduling coordination period, so as to obtain multiple subframe subgroups.

Furthermore, the assigning unit 120 may assign at least a first subframe subgroup of the multiple subframe subgroups to the macro base station 100, and assign at least a second subframe subgroup of the multiple subframe subgroups to the low power node 200. Here, in the at least the first subframe subgroup, an uplink signal as initially transmitted data is transmitted to only the macro base station 100; and in the at least the second subframe subgroup, an uplink signal as initially transmitted data is transmitted to only the low power node 200. In this way, the probability that the UE 300 transmits the uplink signal as initially transmitted data to the macro base station 100 and the low power node 200 simultaneously is efficiently reduced. The assigning unit 120 may assign uplink subframes for which transmission overlap occurs. Here, within the scheduling coordination period, if in the initial transmission scheduling an uplink subframe is assigned by the assigning unit 120 to one base station node of the macro base station 100 and the low power node 200 for scheduling, the other base station node of the macro base station 100 and the low power node 200 cannot schedule all the subframes in a subframe subgroup to which the uplink subframe belongs to perform uplink initial transmission.

As shown in FIG. 4, in a case that a distance of n subframes (n=2) is staggered between wireless frames and since a subframe 0 and a subframe 1 in one wireless frame are a downlink subframe and a special subframe respectively, a subframe 2 is an uplink subframe certainly, a subframe 3 is also an uplink subframe other than in the configurations 2 and 5, the subframe 2 and the subframe 3 do not overlap in an uplink direction. Particularly, for the configurations 0, 1, 2 and 6, if two subframes are staggered in advance, not only the uplink subframes 2/3 do not overlap but also uplink subframes 7/8 do not overlap either.

Figure 5:
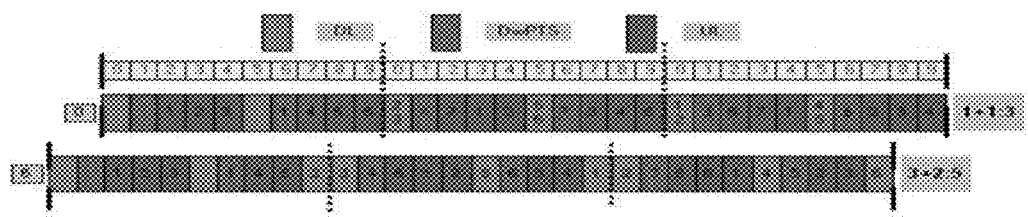
FIG. 5 is a schematic diagram of staggered TDD wireless subframes.

Practically, a shift operation of the wireless frame cannot completely avoid overlap of uplink subframes in various combinations of configurations. As shown in FIG. 5, uplink subframes always overlap between configurations 0/3/6. Hence, the overlapped subframe can be provided to only one of the macro base station 100 and the low power node 200 for PUCCH transmission and initial transmission of PUSCH/PRACH/SRS.

For configurations 1-5, since an RTT of an uplink HARQ is 10 ms, initial transmission and retransmission are performed in the same subframe, and coordinating may be performed between the macro base station 100 and the low power node 200 based on a subframe serial number; subframes with the same serial number can be used by one of the macro base station 100 and the low power node 200, the subframe for initial transmission and the subframe for retransmission do not overlap, hence uplink subframes at the same locations in different wireless frames are grouped together, and subframe overlap may be efficiently avoided by taking multiples of 10 ms as one coordinating period. In other words, in a case that uplink/downlink reference configurations for coordinating subframe assignment of the UE 300 at the macro base station 100 and the low power node 200 belong to the TDD standard, uplink subframes or special subframes at same locations within different wireless frames are grouped together for an uplink/downlink matching whose RTT of the HARQ is 10 ms. For the configuration 0 and the configuration 6, since one uplink subframe is delayed in each retransmission, coordinating based on the subframe serial number only adapts to the PUCCH transmission and initial transmission of PUSCH/SRS/PRACH, the TDD grouping solution above may result in that subframe overlap occurs between initial transmission or retransmission of the node and retransmission or initial transmission of other nodes. Preferably, in case of the configurations 0 and 6, 2-5 (configuration 0) subframe subgroups and 2-4 (configuration 6) subframe subgroups corresponding to continuous adjacent uplink subframes are assigned to the same node for uplink transmission, in this way, a probability that an uplink initial transmission and retransmission conflict occurs between base station nodes may be further reduced.

In the TDD coordinating scene, in a case that two base station nodes use time-continuous adjacent uplink subframes respectively, the base station node with a larger TA value uses the previous subframe, and the base station node with a smaller TA value uses the next subframe, in this way, interference between symbols of adjacent subframes on different carriers may be avoided.

Subsequently, a case that the wireless communication system is an FDD system or the wireless communication system is a TDD and FDD hybrid system and the uplink/downlink reference configurations for coordinating subframe assignment of the UE 300 at the macro base station 100 and the low power node 200 belong to an FDD standard is considered.

For example, in order to avoid frame overlap from occurring, an RTT (Round-Trip Time) of the FDD is 8 ms, hence eight configuration subgroups (serial numbers 0-7) are used to perform scheduling coordination to avoid a scene of frame overlap between initial transmission and retransmission. In other words, in case of assigning and coordinating FDD carriers and the RTT of an HARQ (Hybrid Automatic Repeat Request) being 8 ms, subframes whose serial numbers are the same after mode 8 are grouped together. A specific configuration may be set as follows (not limited to the example): it is assumed that the subframe serial number is a natural number, n=wireless frame serial number*10+ subframe serial number (it should be noted that, the wireless frame serial number ranges from 0 to the maximum wireless frame serial number-1, and the subframe serial number may range from 0 to 9), the configuration subgroup corresponding to the subframe serial number is a value of n % 8. One configuration group can be used by only one base station node, which base station node using which configuration group is determined by a backhaul signaling interaction between two base station nodes according to the service volume. Specifically, coordination information for inter base-station may be confirmed by an interaction using a logic X2 or an S1 interface for a wired backhaul. In a case that a certain uplink configuration group is determined to be used by the macro base station 100 or the low power node 200, downlink scheduling subframes corresponding to these uplink subframes (i.e., downlink subframes for the previous 4 ms) can be used only by the macro base station 100 or the low power node 200. In addition, in order to avoid symbol overlap, in a case that two base station nodes use configurations whose serial numbers are adjacent, a base station node whose TA value is larger may use the configuration whose serial number is smaller. Particularly, it should be noted that a configuration subgroup 0 and a configuration subgroup 7 are adjacent configurations, and the configuration subgroup 7 is the configuration whose serial number is smaller. Particularly, a scheduling coordination period may be set as multiples of 8 ms, for example 40 ms, 80 ms, 160 ms, 320 ms and so on.

Subsequently a case that the wireless communication system is the TDD and FDD hybrid system and the uplink/downlink reference configurations for coordinating subframe assignment of the UE 300 at the macro base station 100 and the low power node 200 belong to different standards (i.e., one belongs to the TDD standard, and the other belongs to the FDD standard) is considered. In this case, a scheduling unit 150 may be further provided in the macro base station 100, as shown in FIG. 2.

The scheduling unit 150 may schedule the UE 300, such that an uplink signal is transmitted to a base station node using an FDD uplink/downlink reference configuration of the macro base station 100 and the low power node 200 during only time slots of downlink subframes or special subframes of a base station node using a TDD uplink-downlink reference configuration of the macro base station 100 and the low power node 200, so as to avoid uplink subframe overlap.

Furthermore, the scheduling unit 150 may schedule the UE 300, such that an uplink signal is transmitted to one base station node of the macro base station 100 and the low power node 200 over even subframes, and an uplink signal is transmitted to the other base station node of the macro base station 100 and the low power node 200 over odd subframes.

According to the embodiment of the present disclosure, the UE 300 performs uplink transmission of the FDD base station on the TDD downlink subframe, in this way, a probability of frame overlap may be reduced to some extent. However, the RTT of the FDD is 8 ms, the RTTs of configurations 1-5 in TDD are 10 ms, uplink retransmission for configurations 0 and 6 is always delayed for one uplink subframe from the subframe for the last transmission. Hence, coordinating based on the subframe serial number can only avoid frame overlap between initial transmission and initial transmission (i.e., the PUCCH is transmitted in the same subframes simultaneously), but cannot avoid subframe overlap between initial transmission data and retransmission data. The uplink transmissions of the FDD base station and the TDD base station are scheduled over the odd frames and the even frames in staggered serial number respectively, in this way, frame overlap between initial transmission and initial transmission and frame overlap between initial transmission and retransmission for configurations 1-5 of the FDD and the TDD can be avoided.

In the FDD and TDD hybrid coordinating scene, in a case that two base station nodes use time-continuous adjacent uplink subframes respectively, a base station node whose TA value is larger uses the previous subframe, and a base station node whose TA value is smaller uses the next subframe, thereby avoiding interference between symbols of adjacent subframes on different carriers.

Since the uplink transmission and the PUCCH feedback are caused by the downlink scheduling or the downlink data transmission, in the FDD scene, a downlink scheduling subframe corresponding to the uplink subframe is a subframe in the previous 4 ms, and there is one-to-one correspondence between them. In the TDD scene, for the PUCCH and the PUSCH of the uplink subframe, the PDSCH transmission and the PUSCH scheduling are performed on the corresponding downlink subframe, hence uplink scheduling coordination also means downlink scheduling coordination.

According to the embodiments of the present disclosure, the probability that the UE 300 transmits the uplink signal to the macro base station 100 and the low power node 200 simultaneously can be reduced as much as possible. When a case that the UE 300 transmits the uplink signal to the macro base station 100 and the low power node 200 simultaneously cannot be avoided completely, measures need to be taken to address the issue of exceeding the maximum transmission power in uplink transmission.

Figure 6:
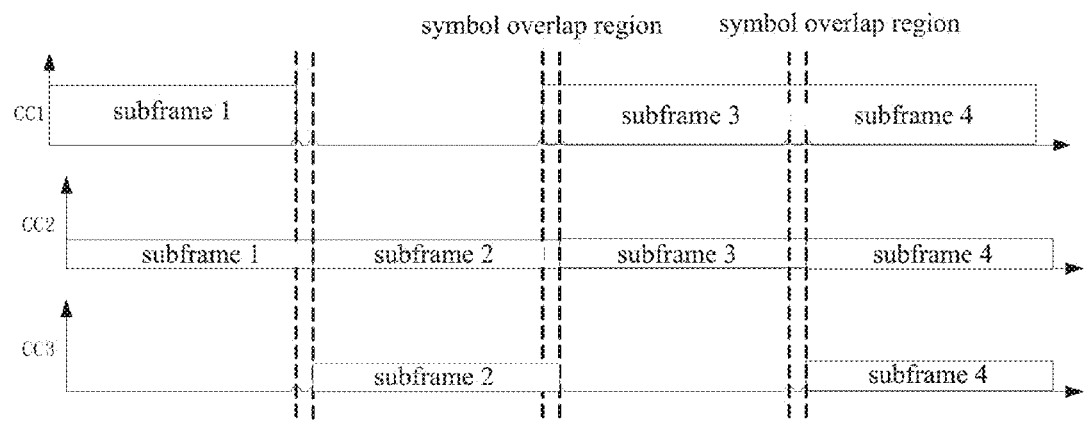
FIG. 6 is a schematic diagram of a scene of uplink transmission overlap.

FIG. 6 shows an overlap state of uplink transmission in a case that no scheduling coordination is performed between two network aggregated nodes. In which, for a subframe 1 and a subframe 3, the UE 300 may transmit non-PUCCH data to the low power node 200 on a CC2 or a CC3, and it is assumed that the UE 300 transmits the non-PUCCH data on the CC2 for simplicity. Since the UE 300 is farther from the macro base station 100 than from the low power node 200, an uplink signal for the CC1 is transmitted in advance relative to an uplink signal for the CC2/CC3 in the same subframe to ensure arrival synchronization of the uplink signals.

As shown in FIG. 6, subframe overlap occurs in subframes 1, 3 and 4. In a case that a transmission power of the UE 300 is greater than the maximum transmission power of the UE 300 when the UE 300 transmits data on the CC1 and the CC2/CC3 simultaneously, measures need to be taken to process the issue.

Figure 7:
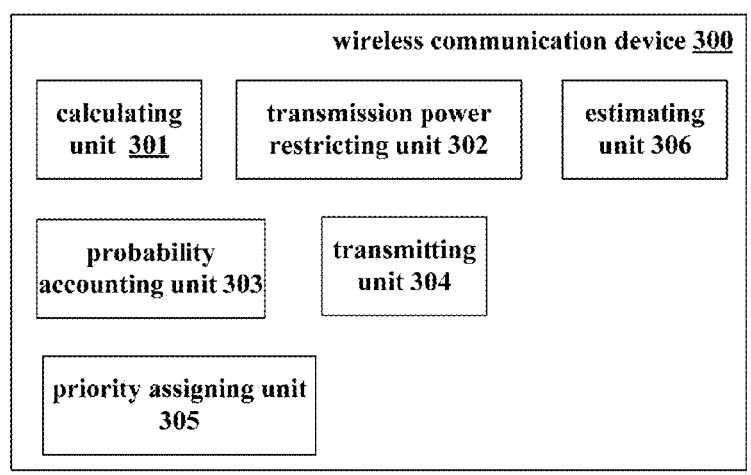
FIG. 7 is a block diagram of a wireless communication device according to an embodiment of the present disclosure.

FIG. 7 shows a block diagram of a wireless communication device (i.e., a UE) 300 according to an embodiment of the present disclosure. As shown in FIG. 7, the wireless communication device 300 may include a calculating unit 301, a transmission power restricting unit 302, an estimating unit 306, a probability accounting unit 303, a transmitting unit 304 and a priority assigning unit 305.

The calculating unit 301 may calculate an uplink signal transmitting power when the wireless communication device 300 transmits an uplink signal to the macro base station 100 and/or the low power node 200.

In a case that the uplink signal transmitting power calculated by the calculating unit 301 exceeds a predetermined threshold, the transmitting power restricting unit 302 may restrict the uplink signal transmitting power of the uplink signal, such that an actual uplink signal transmitting power does not exceed the predetermined threshold. The estimating unit 306 may estimate an estimation probability that the uplink signal transmitting power of the wireless communication device 300 exceeds the predetermined threshold.

Furthermore, the probability accounting unit 303 may account an accounting probability that the uplink signal transmitting power exceeds the predetermined threshold in actual transmission.

The transmitting unit 304 may transmit the estimation probability estimated by the estimating unit 306 or the accounting probability accounted by the probability accounting unit 303 to the macro base station 100. Based on the estimation probability estimated by the estimating unit 306 or the accounting probability accounted by the probability accounting unit 303, the macro base station 100 may initiate scheduling coordination with the low power node 200.

Furthermore, based on a path loss of a downlink carrier of the macro base station 100, a path loss of a downlink carrier of the low power node 200 and an uplink power control parameter of the wireless communication device 300, the estimating unit 301 may estimate an estimation probability that the uplink signal transmitting power exceeds the predetermined threshold.

Furthermore, the priority assigning unit 305 may assign a priority to the uplink signal.

In a case that the uplink signal transmitting power estimated by the estimating unit 301 exceeds the predetermined threshold, the transmitting power restricting unit 302 may restrict, based on the priority of the uplink signal, the uplink signal transmitting power of the uplink signal by at least one of:

discarding an uplink signal with a lower priority;

transmitting the uplink signal with the lower priority by using uplink signal transmission power remained after a requirement for uplink signal transmission power of an uplink signal with a higher priority is satisfied;

performing power compression in proportion for uplink signals with a same priority, such that the compressed uplink signal transmission power does not exceed the predetermined threshold; and performing muting process on the uplink signal with the lower priority in a case that only symbol overlap occurs.

Furthermore, the priority assigning unit 305 may assign a priority to the uplink signal based on at least one of:

whether the uplink signal is initial transmitted data or retransmitted data;

whether the uplink signal is a PUCCH signal, a PUSCH signal, an SRS signal or a PRACH signal;

whether the uplink signal is transmitted to the macro base station 100 or the low power node 200;

whether the uplink signal is transmitted using FDD or TDD; and whether the uplink signal is transmitted to a base station node with a high or a low uplink retransmission probability.

Specifically, referring to FIG. 6, subframe overlap occurs in subframes 1, 3 and 4. In a case that the transmission power of the UE 300 is greater than the maximum transmission power of the UE 300 when the UE 300 transmits data on the CC1 and the CC2/CC3 simultaneously, the transmission power may be processed based on the principle that multiple uplink signals are transmitted on different carriers simultaneously (i.e., for the data priority, PRACH>PUCCH>PUSCH w/UCI (i.e., PUSCH carrying UCI)>PUSCH w/o UCI (i.e., PUSCH carrying no UCI) >SRS, where PUSCHs may share the same priority), except the following cases:

in a case that the transmission power is not sufficient for transmitting PUSCH on the CC1 and the CC2 simultaneously, PUCCHs for two carriers may be transmitted after being performed power compression in proportion; or PUCCH data of the CC2 or the CC1 is transmitted using a power remained after a requirement for PUCCH transmission power of the CC1 or the CC2 is satisfied; or discarding CQI (Channel Quality Indication) information in a case that the power requirement can be satisfied after discarding periodic CQI reporting information; and discarding other transmission data with a low priority;

in a case that the transmission power is not sufficient for transmitting PUSCH carrying the UCI on the CC1 and the CC2/CC3 simultaneously, PUSCH for two carriers may be transmitted after being performed power compression in proportion; or PUSCH data of the CC2 or the CC1 is transmitted using the power remained after the PUSCH transmission power of the CC1 or the CC2 is satisfied, or discarding PUSCH data of the CC2/CC1; or discarding other transmission data with a low priority;

for the same type of data, it may be processed according to the priority of the base station node, for example, the transmission power of the macro base station 100 or the transmission power of the base station node with a high retransmission probability is considered with a priority;

for the same type of data, it may be processed according to the priority of a carrier standard, for example, the power requirement of TDD is satisfied with a priority, since the uplink resource of TDD is less relative to that of the FDD; and for the same type of data, it may be processed according to a priority for initial transmission or retransmission, for example, the priority for the initial transmission is higher than the priority for the retransmission, or the priority for the retransmission is higher than the priority for the initial transmission.

Particularly, in the subframe 2 shown in FIG. 6, the transmission power for frame overlap and the carrier aggregation for intra base-station are processed in the same way (i.e., for the data priority. PRACH>PUCCH>PUSCH w/UCI>PUSCH w/o UCI>SRS, where PUSCHs may share the same priority).

After power assignment for respective carriers on the adjacent subframes is completed according to the transmission power processing principle for frame overlap, it needs to ensure that the overlapped power of overlapped symbols for subframes 2/3 and overlapped symbols for subframes 3/4 does not exceed the maximum transmission power by the following ways:

the UE 300 transmits data for the CC1 or the CC2/CC3 in a muting way on the overlapped symbols (or transmitting with a zero power), so as to ensure that the network can still parse data with a low priority based on error correcting codes without parsing the symbol data correctly:

the UE 300 transmits data with a high priority on the overlapped symbols firstly, and then transmits data with a low priority using the remaining power:

for the transmission data with the same priority, the transmission power thereof may be compressed in proportion such that the transmission power does not exceed the maximum transmission power;

for the same type of data, it may be processed according to the priority of the base station node, for example, the transmission power of the macro base station 100 or the transmission power of a base station node with a high-low retransmission probability is considered with a priority;

for the same type of data, it may be processed according to the priority of a carrier standard, for example, the power requirement of TDD is satisfied with a priority, since the uplink resource of TDD is less relative to that of FDD:

for the same type of data, it may be processed according the priority for initial transmission or retransmission, for example, the priority for the initial transmission is higher than the priority for the retransmission, or the priority for the retransmission is higher than the priority for the initial transmission; or discarding an SRS signal with the lowest priority.

Particularly, according to the above processing ways, in case of symbol overlap for multiple TAs, the following scenes are to be increased in addition to the scenes listed above:

in a case that symbol overlap occurs between PUCCH at the previous subframe on the CC1/CC2 and PUCCH at the next subframe on the CC2/CC1 and the total transmission power exceeds the maximum transmission power of the UE 300, it needs to ensure that the overlapped power does not exceed the maximum transmission power;

in a case that the CC1 and the CC2/CC3 transmit PUSCH w/UCI at the previous subframe and the next subframe of the overlapped symbols, it needs to ensure that the overlapped power does not exceed the maximum transmission power; and in the previous subframe and the next subframe of the overlapped symbol, for the CC and the CC2/CC3, PUSCH w/UCI is transmitted at the previous subframe/next subframe, and PUSCH w/o UCI is transmitted at the next subframe/previous subframe, it needs to ensure that the overlapped power does not exceed the maximum transmission power.

According to the embodiments of the present disclosure, in a case that a wireless cellular communication system performs carrier aggregation for inter base-station adopting the same or different standard in a heterogeneous network scene, simultaneous transmission on uplink carriers of different base station nodes can be avoided as much as possible, selection and adjustment may be performed based on different uplink signal contents in a case that simultaneous transmission is performed on uplink carriers of different base station nodes, such that the uplink transmission power does not exceed the maximum transmission power of the terminal.

Subsequently, a method for performing wireless communication in a wireless communication system is described. The wireless communication system may include a first base station node, a second based station node and a wireless communication device communicating with the first and second base station nodes. The method may include: performing, by the first and second base station node, scheduling coordination, so as to reduce a probability that the wireless communication device transmits an uplink signal to the first and second base station nodes simultaneously.

Preferably, the method according to an embodiment of the present disclosure may further include: selecting, by the first or second base station node, uplink/downlink reference configurations for coordinating subframe assignment of the first and second base station nodes within a scheduling coordination period; grouping, by the first or second base station node, uplink subframes overlapped within the scheduling coordination period according to the reference configurations of the first and second base station nodes; assigning, by the first or second base station node, at least a first subframe subgroup of multiple subframe subgroups to the first base station node, and assigning, by the first or second base station node, at least a second subframe subgroup of the multiple subframe subgroups to the second base station node, so as to coordinate utilizing of possibly overlapping uplink subframes by the first and second base station nodes.

Preferably, an uplink/downlink reference configuration of one of the first and second base station nodes may be set as any one of: a main carrier uplink/downlink configuration of a main carrier of the wireless communication device at one of the first and second base station nodes; a merging set uplink/downlink configuration formed by taking a merging set for uplink subframes of all carriers of the wireless communication device at the one of the first and second base station nodes; and an existing uplink/downlink configuration being closest to the merging set uplink/downlink configuration and containing all the uplink subframes in the merging set uplink/downlink configuration, which is selected from the existing 7 types of uplink/downlink configurations of a TDD standard.

Preferably, the uplink/downlink reference configurations for coordinating subframe assignment of the wireless communication device at the first and second base station nodes may belong to the TDD standard. In this case, the method according to the embodiment of the present disclosure may further include: delaying, by the first or second base station node, a starting frame of TDD wireless frames of one of the first and second base station nodes for two time slots than that of the other of the first and second base station nodes. Preferably, uplink subframes or special subframes at same locations within different wireless frames may be grouped together.

Preferably, the reference configurations for coordinating subframe assignment of the wireless communication device at the first and second base station nodes may belong to different standards. In this case, the method according to the embodiment of the present disclosure may further include: scheduling, by the first or second base station node, the wireless communication device, such that an uplink signal is transmitted to a base station node using an FDD reference configuration of the first and second base station nodes during only time slots of downlink subframes or special subframes of a base station node using a TDD reference configuration of the first and second base station nodes.

Preferably, the first or second base station node may schedule the wireless communication device, such that an uplink signal is transmitted to one of the first and second base station nodes over even subframes, and an uplink signal is transmitted to the other of the first and second base station nodes over odd subframes.

Preferably, the reference configurations for coordinating subframe assignment of the wireless communication device at the first and second base station nodes may belong to the FDD standard, an RTT of the an HARQ is 8 ms, and subframes whose serial numbers are the same after mode 8 are grouped together.

Preferably, in a case that time-continuous adjacent subframes are assigned to the first and second base station nodes, a subframe subgroup to which a subframe whose time is early belongs is assigned to a base station node whose value of TA (Timing advanced) of uplink transmission time is larger of the first and second base station nodes, and a subframe subgroup to which whose time is late belongs is assigned to a base station node whose value of TA (Timing advanced) of uplink transmission time is smaller of the first and second base station nodes.

With the wireless communication method according to the embodiments of the present disclosure described above, the probability that the wireless communication device transmits the uplink signal to the first and second base station nodes simultaneously can be reduced as much as possible. When a case that the wireless communication device transmits the uplink signal to the first and second base station nodes simultaneously cannot be avoided completely, measures need to be taken to address the issue of exceeding the maximum transmission power in uplink transmission.

Figure 8:
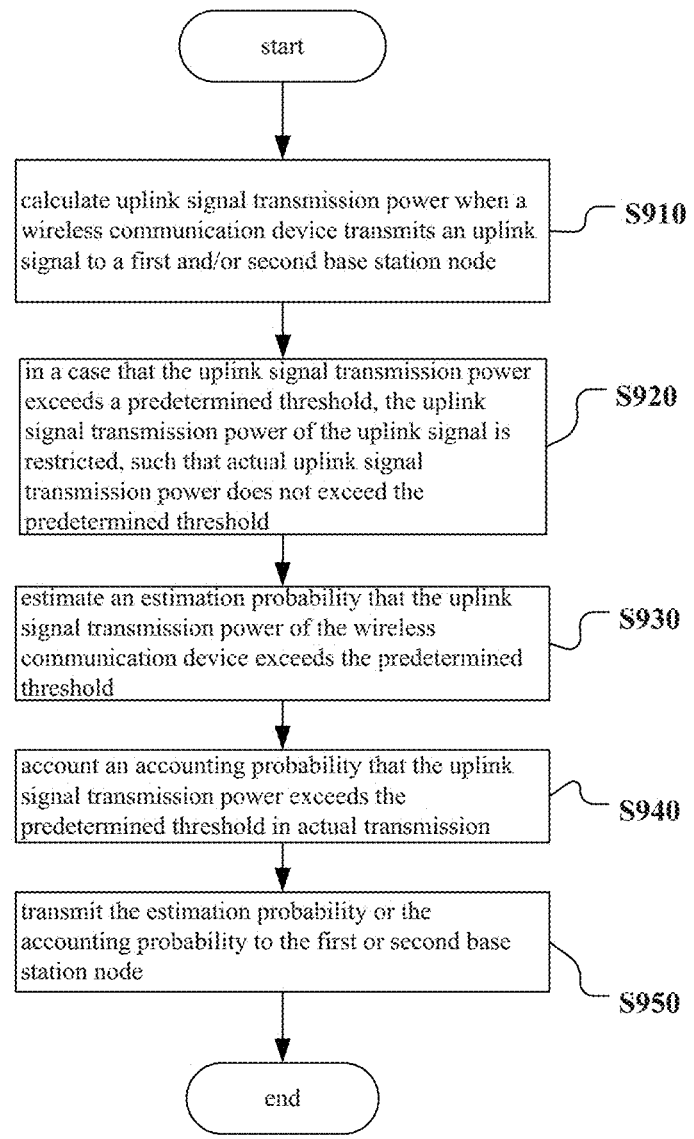
FIG. 8 is a flowchart of a method for performing wireless communication in a wireless communication device in a wireless communication system according to an embodiment of the present disclosure.

FIG. 8 shows a flowchart of a method for performing wireless communication in a wireless communication device in a wireless communication system according to an embodiment of the present disclosure.

As shown in FIG. 8, in step S910, the wireless communication device calculates uplink signal transmission power when the wireless communication device transmits an uplink signal to the first and/or second base station node.

Subsequently, in step S920, in a case that the calculated uplink signal transmission power exceeds a predetermined threshold, the wireless communication device restricts uplink signal transmission power of the uplink signal, such that actual uplink signal transmission power does not exceed a predetermined threshold.

Subsequently, in step S930, an estimation probability that the uplink signal transmission power of the wireless communication device exceeds the predetermined threshold is estimated.

Subsequently, in step S940, an accounting probability that the uplink signal transmission power exceeds the predetermined threshold in actual transmission is accounted.

Lastly, in step S950, the estimation probability or the accounting probability is transmitted to the first or second base station node.

Preferably, based on a path loss of a downlink carrier of the first base station node, a path loss of a downlink carrier of the second base station node and an uplink power control parameter of the wireless communication device, the wireless communication device estimates the estimation probability. Based on the estimation probability, the first and second base station nodes may initiate scheduling coordination with each other.

Preferably, based on the accounting probability, the first and second base station nodes may initiate scheduling coordination with each other.

Preferably, a priority may be assigned to an uplink signal by the wireless communication device. In a case that the estimated uplink signal transmission power exceeds a predetermined threshold, the wireless communication device may restrict, based on the priority of the uplink signal, the uplink signal transmission power of the uplink signal by at least one of:

discarding an uplink signal with a lower priority;

transmitting the uplink signal with the lower priority using uplink signal transmission power remained after a requirement for the uplink signal transmission power of the uplink signal with a higher priority is satisfied;

performing power compression in proportion on the uplink signals with the same priority, such that the compressed uplink signal transmission power does not exceed a predetermined threshold; and performing muting processing on the uplink signal with the lower priority in a case that only symbol overlap occurs.

Preferably, the wireless communication device may assign a priority to the uplink signal based on at least one of:

whether the uplink signal is initially transmitted data or retransmitted data;

whether the uplink signal is a PUCCH signal, a PUSCH signal, an SRS signal or a PRACH signal;

whether the uplink signal is transmitted to the macro base station or the low power node;

whether the uplink signal is transmitted using FDD or TDD; and whether the uplink signal is transmitted to a base station node with a high or a low retransmission probability.

Specific implementation ways of various steps of the method for performing wireless communication in a wireless communication system according to the embodiments of the present disclosure are described in detail above, which are not described here.

Apparently, various operation processes of the method for performing wireless communication in a wireless communication system according to the present disclosure may be implemented by computer executable programs stored in various machine readable storage mediums.

Furthermore, the object of the present disclosure may be implemented by the following way. A storage medium storing the executable program codes is provided to the system or device directly or indirectly, and a computer or a CPU (Central Processing Unit) in the system or device reads and executes the program codes. In this case, as long as the system or device has a function of performing programs, the implementation way of the present disclosure is not limited to programs, and the programs may have any form, for example, an object program, a program executed by an interpreter or scripts provided to the operating system or the like.

The machine readable storage medium includes but not limited to various memories and storage units, semiconductor devices, magnetic disk units for example an optical disk, a magnetic disk and a magnetic-optical disk, and other mediums adapting to storage information.

In addition, the computer, through a corresponding website connected to the Internet, downloads and installs the computer program codes according to the present disclosure into the computer and executes the program, thereby achieving the technical solutions of the present disclosure.

Figure 9:
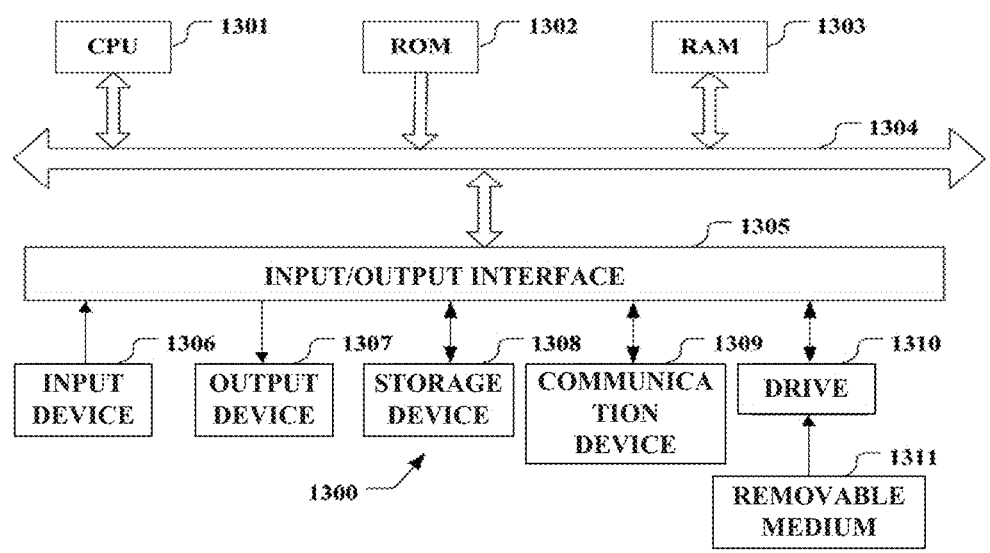
FIG. 9 is an exemplary structural block diagram of a general purpose personal computer for performing the method for performing wireless communication in a wireless communication system according to an embodiment of the present disclosure.

FIG. 9 is an exemplary structural block diagram of a general purpose personal computer for performing the method for performing wireless communication in a wireless communication system according to an embodiment of the present disclosure.

As shown in FIG. 9, a CPU 1301 performs various types of processing according to programs stored in a ROM (Read Only Memory) 1302 or programs loaded from a storage portion 1308 to an RAM (Random Access Memory) 1303. In the RAM 1303, data required when the CPU 1301 performs various types of processing may also be stored as needed. The CPU 1301, the ROM 1302 and the RAM 1303 are connected to each other via a bus 1304. An input/output interface 1305 is also connected to the bus 1304.

The following components are connected to the input/output interface 1305: an input portion 1306 (including a keyboard, a mouse and so on), an output portion 1307 (including a display, for example a CRT (Cathode Ray Tube), an LCD (Liquid Crystal Display), and a loudspeaker and so on), a storage portion 1308 (including a hard disk and so on) and a communication portion 1309 (including a network interface card, such as an LAN card and a modem). The communication portion 1309 performs communication processing via a network such as the Internet. A driver 1310 may also be connected to the input/output interface 1305 as needed. A removable medium 1311 for example a magnetic disk, an optical disk, a magnetic-optical disk, a semiconductor memory is installed on the driver 1310 as needed, such that computer programs read from the removable medium 1311 are installed into the storage portion 1308 as needed.

In a case that the series of processing above is performed by software, programs constituting the software are installed from the network such as the Internet or a storage medium such as the removable medium 1311.

It should be understood by those skilled in the art that, the storage medium is not limited to the removable medium 1311 storing programs and transmitted separately from the device to the user to provide programs as shown in FIG. 9. The removable medium 1311 includes a magnetic disk (including a floppy disk (registered trademark)), an optical disk (including an CD-ROM (Compact Disk Read-Only Memory) and a Digital Versatile Disk (DVD)), a magnetic optical disk (including an MD (Mini Disk) (registered trademark)) and a semiconductor memory. Alternatively, the storage medium may be the ROM 1302, a hard disk contained in the storage portion 1308 and so on, in which programs are stored and the storage medium and the devices including the storage medium together are distributed to the user.

It should be noted that, in addition to the wireless communication system and the method for performing wireless communication in a wireless communication system mentioned above, apparently according to the present disclosure, a base station node in the wireless communication system, a method for performing wireless communication in the base station node in the wireless communication system, a wireless communication device in the wireless communication system and a method for performing wireless communication in the wireless communication device of the wireless communication system are further provided.

According to the embodiments of the present disclosure, a base station node in a wireless communication system is provided, and the wireless communication system further includes another base station node and a wireless communication device communicating with the base station node and the another base station node. In which, the base station node and the another base station node perform scheduling coordination, so as to reduce a probability that the wireless communication device transmits an uplink signal to the base station node and the another base station node simultaneously.

Preferably, the base station node is a macro base station, and the another base station node is a low power node.

Preferably, in a case that the wireless communication device transmits the uplink signal to the base station node and the another base station node simultaneously, transmission overlap of same subframes or symbol transmission overlap between subframes occurs.

Preferably, the uplink signal includes a PUCCH (Physical Uplink Control Channel) signal, a PUSCH (Physical Uplink Shared Channel) signal, an SRS (Sounding Reference Signal) and a PRACH (Physical Random Access Channel) signal.

Preferably, a probability that the wireless communication device transmits the uplink signal to the base station node is reduced, thereby reducing the probability that the wireless communication device transmits the uplink signal to the base station node and the another base station node simultaneously.

Preferably, the base station node includes: a selecting unit for selecting uplink/downlink reference configurations for coordinating subframe assignment of the base station node and the another base station node within a scheduling coordination period; a grouping unit for grouping uplink subframes overlapped within the scheduling coordination period according to the reference configurations of the base station node and the another base station node, to obtain multiple subframe subgroups; and an assigning unit for assigning at least a first subframe subgroup of the multiple subframe subgroups to the base station node and assigning at least a second subframe subgroup of the multiple subframe subgroups to the another base station node, to coordinate utilizing of possibly overlapping uplink subframes by the base station node and the another base station node.

Preferably, an uplink/downlink reference configuration of one of the base station node and the another base station node may be set as any one of: a main carrier uplink/downlink configuration of a main carrier of the wireless communication device at the one of the base station node and the another base station node; a merging set uplink/downlink configuration formed by taking a merging set for uplink subframes of all carriers of the wireless communication device at the one of the base station node and the another base station node; and an existing uplink/downlink configuration being closest to the merging set uplink/downlink configuration and containing all the uplink subframes in the merging set uplink/downlink configuration, which is selected from the existing 7 types of uplink/downlink configurations of a TDD (Time Division Duplexing) standard.

Preferably, the reference configurations for coordinating subframe assignment of the wireless communication device at the base station node and the another base station node belong to the TDD (Time Division Duplexing) standard, and uplink subframes or special subframes at same locations within different wireless frames are grouped together.

Preferably, the base station node further includes: a delaying unit for delaying a starting frame of TDD (Time Division Duplexing) wireless frames of one of the base station node and the another base station node for two time slots than that of the other of the base station node and the another base station node.

Preferably, the reference configurations for coordinating subframe assignment of the wireless communication device at the base station node and the another base station node belong to different standards, and the base station node includes: a scheduling unit for scheduling the wireless communication device, such that the uplink signal is transmitted to a base station using an FDD (Frequency Division Duplexing) reference configuration of the base station node and the another base station node during only time slots of downlink subframes or special subframes of a base station node using a TDD (Time Division Duplexing) reference configuration of the base station node and the another base station node.

Preferably, the scheduling unit schedules the wireless communication device, such that the uplink signal is transmitted to one of the base station node and the another base station node over even subframes, and to the other of the base station node and the another base station node over odd subframes.

Preferably, the reference configurations for coordinating subframe assignment of the wireless communication device at the base station node and the another base station node belong to an FDD (Frequency Division Duplexing) standard, an RTT (Round-Trip Time) of an HARQ (Hybrid Automatic Repeat Request) is 8 ms, and subframes whose serial numbers are the same after mod 8 are grouped together.

Preferably, in a case that time-continuous adjacent subframes are assigned to the base station node and the another base station node respectively, a subframe subgroup to which a subframe whose time is early belongs is assigned by the assigning unit to a base station node whose value of TA (Timing Advanced) of uplink transmission time is larger of the base station node and the another base station node, and a subframe subgroup to which a subframe whose time is late belongs is assigned by the assigning unit to a base station node whose value of TA (Timing Advanced) of uplink transmission is smaller of the base station node and the another base station node.

According to the embodiments of the present disclosure, a method for performing wireless communication in a base station node in a wireless communication system is provided, which includes: performing scheduling coordination with another base station node in the wireless communication system, to reduce a probability that the wireless communication device in the wireless communication system transmits the uplink signal to the base station node and the another base station node simultaneously.

Preferably, the method further includes: selecting, by the base station node or the another base station node, uplink/downlink reference configurations for coordinating subframe assignment of the base station node and the another base station node within a scheduling coordination period; grouping, by the base station node or the another base station node, uplink subframes overlapped within the scheduling coordination period according to the reference configurations of the base station node and the another base station node, to obtain multiple subframe subgroups; assigning, by the base station node or the another base station node, at least a first subframe subgroup of the multiple subframe subgroups to the base station node, and assigning, by the base station node or the another base station node, at least a second subframe subgroup of the multiple subframe subgroups to the another base station node, to coordinate utilizing of possibly overlapping uplink subframes by the base station node and the another base station node.

Preferably, the uplink/downlink reference configuration of one of the base station node and the another base station node may be set as any one of: a main carrier uplink/downlink configuration of a main carrier of the wireless communication device at the one of the base station node and the another base station node; a merging set uplink/downlink configuration formed by taking a merging set of uplink subframes of all carriers of the wireless communication device at the one of the base station node and the another base station node; and an existing uplink/downlink configuration being closest to the merging set uplink/downlink configuration and containing all uplink subframes in the merging set uplink/downlink configuration, which is selected from the existing 7 types of uplink/downlink configurations of a TDD (Time Division Duplexing) standard.

Preferably, uplink subframes or special subframes at same locations within different wireless frames are grouped together.

Preferably, the reference configurations for coordinating subframe assignment of the wireless communication device at the base station node and the another base station node belong to a TDD (Time Division Duplexing) standard, and the method further includes: delaying a starting frame of TDD (Time Division Duplexing) wireless frames of one of the base station node and the another base station node for two time slots than that of the other of the base station node and the another base station node.

Preferably, the reference configurations for coordinating subframe assignment of the wireless communication device at the base station node and the another base station node belong to different standards, and the method further includes: scheduling the wireless communication device, such that the uplink signal is transmitted to a base station node using an FDD (Frequency Division Duplexing) reference configuration of the base station node and the another base station node during only time slots of downlink subframes or special subframes of a base station node using a TDD (Time Division Duplexing) reference configuration of the base station node and the another base station node.

Preferably, the base station node schedules the wireless communication device, such that the uplink signal is transmitted to one of the base station node and the another base station node over even subframes, and to the other of the base station node and the another base station node over odd subframes.

Preferably, the reference configurations for coordinating subframe assignment of the wireless communication device at the base station node and the another base station node belong to an FDD (Frequency Division Duplexing) standard, an RTT (Round-Trip Time) of an HARQ (Hybrid Automatic Repeat Request) is 8 ms, and subframes whose serial numbers are the same after mod 8 are grouped together.

Preferably, in a case that time-continuous adjacent subframes are assigned to the base station node and the another base station node respectively, a subframe group to which a subframe whose time is early belongs is assigned to a base station node whose value of TA (Timing Advanced) of uplink transmission time is larger of the base station node and the another base station node, and a subframe group to which a subframe whose time is late belongs is assigned to a base station node whose value of TA (Timing Advanced) of uplink transmission time is smaller of the base station node and the another base station node.

According to the embodiments of the present disclosure, a wireless communication device in a wireless communication system is provided, which includes: a calculating unit for calculating uplink signal transmission power when the wireless communication device transmits an uplink signal to a first and/or second base station node in the wireless communication system; a transmission power restricting unit for restricting the uplink signal transmission power of the uplink signal in a case that the uplink signal transmission power calculated by the calculating unit exceeds a predetermined threshold, such that actual uplink signal transmission power does not exceed the predetermined threshold; an estimating unit for estimating an estimation probability that the uplink signal transmission power of the wireless communication device exceeds the predetermined threshold; a probability accounting unit for accounting an accounting probability that the uplink signal transmission power exceeds the predetermined threshold in actual transmission; and a transmitting unit for transmitting the estimation probability or the accounting probability to the first or second base station node.

Preferably, based on a path loss of a downlink carrier of the first base station node, a path loss of a downlink carrier of the second base station node and an uplink power control parameter of the wireless communication device, the estimating unit estimates the estimation probability; and based on the estimation probability, the first and second base station nodes initiate scheduling coordination with each other.

Preferably, based on the accounting probability, the first and second base station nodes initiate scheduling coordination with each other.

Preferably, the wireless communication device further includes: a priority assigning unit for assigning a priority to the uplink signal, where in a case that the uplink signal transmission power estimated by the estimating unit exceeds the predetermined threshold, the transmission power restricting unit restricts, based on the priority of the uplink signal, the uplink signal transmission power of the uplink signal by at least one of: discarding an uplink signal with a lower priority; transmitting the uplink signal with the lower priority using uplink signal transmission power remained after a requirement for the uplink signal transmission power of an uplink signal with a higher priority is satisfied; performing power compression in proportion for uplink signals with the same priority, such that the compressed uplink signal transmission power does not exceed the predetermined threshold; and performing muting processing on uplink signals with the lower priority in a case that only symbol overlap occurs.

Preferably, the priority assigning unit assigns the priority to the uplink signal based on at least one of: whether the uplink signal is initial transmitted data or retransmitted data; whether the uplink signal is a PUCCH (Physical Uplink Control Channel) signal, a PUSCH (Physical Uplink Shared Channel) signal, an SRS (Sounding Reference Signal) or a PRACH (Physical Random Access Channel) signal; whether the uplink signal is transmitted to the macro base station or the low power node; whether the uplink signal is transmitted using FDD (Frequency Division Duplexing) or TDD (Time Division Duplexing); and whether the uplink signal is transmitted to a base station node with a high or low retransmission probability.

According to the embodiments of the present disclosure, a method for performing wireless communication in a wireless communication device in a wireless communication system is provided, which includes: calculating uplink signal transmission power when the wireless communication device transmits an uplink signal to a first and/or second base station node in the wireless communication system restricting, by the wireless communication device, uplink signal transmission power of the uplink signal, in a case that the calculated uplink signal transmission power exceeds a predetermined threshold, such that actual uplink signal transmission power does not exceed the predetermined threshold; estimating an estimation probability that the uplink signal transmission power of the wireless communication device exceeds the predetermined threshold; accounting an accounting probability that the uplink signal transmission power exceeds the predetermined threshold in actual transmission; and transmitting the estimation probability or the accounting probability to the first or second base station node.

Preferably, based on a path loss of a downlink carrier of the first base station node, a path loss of a downlink carrier of the second base station node and an uplink power control parameter of the wireless communication device, the wireless communication device estimates the estimation probability; and based on the estimation probability, the first and second base station nodes initiate scheduling coordination with each other.

Preferably, based on the accounting probability, the first and second base station nodes initiate scheduling coordination with each other.

Preferably, the method further includes: assigning a priority to the uplink signal, where in a case that the estimated uplink signal transmission power exceeds the predetermined threshold, the uplink signal transmission power of the uplink signal is restricted based on the priority of the uplink signal by at least one of: discarding an uplink signal with a lower priority; transmitting the uplink signal with lower priority using uplink signal transmission power remained after a requirement for the uplink signal transmission power of an uplink signal with a higher priority is satisfied; performing power compression in proportion for uplink signals with the same priority, such that the compressed uplink signal transmission power does not exceed the predetermined threshold; and performing muting processing on the uplink signal with the lower priority in a case that only symbol overlap occurs.

Preferably, a priority is assigned to the uplink signal based on at least one of: whether the uplink signal is initially transmitted data or retransmitted data; whether the uplink signal is a PUCCH (Physical Uplink Control Channel) signal, a PUSCH (Physical Uplink Shared Channel) signal, an SRS (Sounding Reference Signal) or a PRACH (Physical Random Access Channel) signal; whether the uplink signal is transmitted to the macro base station or the low power node; whether the uplink signal is transmitted using FDD (Frequency Division Duplexing) or TDD (Time Division Duplexing); and whether the uplink signal is transmitted to a base station node with a high or low retransmission probability.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiments of the present disclosure have been described in detail in combination with the drawings above, it should be understood that, the embodiments described above are only used to explain the present disclosure and is not constructed as the limitation to the present disclosure. For those skilled in the art, various modifications and alternations can be made to the above embodiments without departing from the essential and scope of the present disclosure. Therefore, the scope of the present disclosure is only defined by the appended claims and the equivalents thereof.

The invention claimed is:

1. An electronic device, comprising circuitry, configured to
communicate with a first base station through a first component carrier group and communicate with a second base station through a second component carrier group under dual connectivity, wherein data transmissions towards to the first and second base station are scheduled respectively by the first and second base station,
determine whether first uplink transmission(s) in a first subframe of the first component carrier group overlaps in time with second uplink transmission(s) in a second subframe of the second component carrier group, and
if yes, allocate transmission power to the first component carrier group and the second component carrier group on a per transmission basis according to a priority order based on uplink control information,
wherein power allocation to an uplink transmission with a higher priority precedes power allocation to an uplink transmission with a lower priority while a total transmission power allocated to the first uplink transmission(s) and the second uplink transmission(s) does not exceed a maximum transmission power.

2. The electronic device according to claim 1, wherein
the first uplink transmission(s) comprise Physical Uplink Control Channel (PUCCH) and/or Physical Uplink Shared Channel (PUSCH) transmission with or without uplink control information of the first component carrier group; and
the second uplink transmission(s) comprise PUCCH, PUSCH with or without uplink control information and/or Sounding Reference Signal (SRS) transmission of the second component carrier group.

3. The electronic device according to claim 2, wherein SRS transmission has the lowest priority and the circuitry is configured to drop the SRS transmission in case of collision.

4. The electronic device according to claim 1, wherein
the circuitry is configured to determine the priority order based on character of the first base station and the second base station in case that the first uplink transmission(s) involves the same type of data transmission with the second uplink transmission(s), wherein uplink transmission of base station with a first character has higher priority than uplink transmission of base station with a second character.

5. The electronic device according to claim 4, wherein
the base station with the first character corresponds to macro base station while the base station with the second character corresponds to low power node.

6. The electronic device according to claim 5, wherein the circuitry is configured to take precede to allocate transmission power to the uplink transmission of the macro base station involving uplink control information and allocate remaining transmission power to the uplink transmission of the low power node involving uplink control information.

7. The electronic device according to claim 4, wherein
the first uplink transmission(s) and the second uplink transmission(s) both involves uplink control information transmission.

8. The electronic device according to claim 1, wherein the circuitry is configured to scale the first uplink transmission(s) and/or second uplink transmission(s) such that the total transmission power allocated to the first uplink transmission(s) and the second uplink transmission(s) does not exceed the maximum transmission power.

9. The electronic device according to claim 1, wherein the electronic device receives configurations for uplink power control from the first base station and the second base station which communicating with each other via backhaul signaling for the dual connectivity.

10. The electronic device according to claim 1, wherein the electronic device is implemented as a user equipment.

11. A communication method for a user equipment, comprising
communicating with a first base station through a first component carrier group and communicate with a second base station through a second component carrier group under dual connectivity, wherein data transmissions towards to the first and second base station are scheduled respectively by the first and second base station,
determining whether first uplink transmission(s) in a first subframe of the first component carrier group overlaps in time with second uplink transmission(s) in a second subframe of the second component carrier group, and
if yes, allocating transmission power to the first component carrier group and the second component carrier group on a per transmission basis according to a priority order based on uplink control information, wherein power allocation to an uplink transmission with a higher priority precedes power allocation to an uplink transmission with a lower priority while a total transmission power allocated to the first uplink transmission(s) and the second uplink transmission(s) does not exceed a maximum transmission power.

12. The method according to claim 11, wherein
the first uplink transmission(s) comprise Physical Uplink Control Channel (PUCCH) and/or Physical Uplink Shared Channel (PUSCH) transmission with or without uplink control information of the first component carrier group; and
the second uplink transmission(s) comprise PUCCH, PUSCH with or without uplink control information and/or Sounding Reference Signal (SRS) transmission of the second component carrier group.

13. The method according to claim 12, wherein SRS transmission has the lowest priority and the circuitry is configured to drop the SRS transmission in case of collision.

14. The method according to claim 11, wherein
the method further comprises determining the priority order based on character of the first base station and the second base station in case that the first uplink transmission(s) involves the same type of data transmission with the second uplink transmission(s), wherein uplink transmission of base station with a first character has higher priority than uplink transmission of base station with a second character.

15. The method according to claim 14, wherein
the base station with the first character corresponds to macro base station while the base station with the second character corresponds to low power node.

16. The method according to claim 15, wherein the method further comprises taking precede to allocate transmission power to the uplink transmission of the macro base station involving uplink control information and allocate remaining transmission power to the uplink transmission of the low power node involving uplink control information.

17. The method according to claim 14, wherein
the first uplink transmission(s) and the second uplink transmission(s) both involves uplink control information transmission.

18. The method according to claim 11, wherein the method further comprises scaling the first uplink transmission(s) and/or second uplink transmission(s) such that the total transmission power allocated to the first uplink transmission(s) and the second uplink transmission(s) does not exceed the maximum transmission power.

19. The method according to claim 11, wherein the method further comprises receiving configurations for uplink power control from the first base station and the second base station which communicating with each other via backhaul signaling for the dual connectivity.

20. A non-transitory computer readable storage medium including executable instructions, which when executed by an information processing machine cause the information processing machine to execute a method for a user equipment, the method comprising:
communicating with a first base station through a first component carrier group and communicate with a second base station through a second component carrier group under dual connectivity, wherein data transmissions towards to the first and second base station are scheduled respectively by the first and second base station,
determining whether first uplink transmission(s) in a first subframe of the first component carrier group overlaps in time with second uplink transmission(s) in a second subframe of the second component carrier group, and
if yes, allocating transmission power to the first component carrier group and the second component carrier group on a per transmission basis according to a priority order based on uplink control information,
wherein power allocation to an uplink transmission with a higher priority precedes power allocation to an uplink transmission with a lower priority while a total transmission power allocated to the first uplink transmission(s) and the second uplink transmission(s) does not exceed a maximum transmission power.

* * * * *